US012746421B2

(12) United States Patent
Laskaris

(10) Patent No.: US 12,746,421 B2
(45) Date of Patent: Sep. 29, 2026

(54) FIRE TRUCK CHASSIS WITH POWER-CONSERVING ELECTRIC PUMP SYSTEM

(71) Applicant: Hale Products, Inc., Collegeville, PA (US)

(72) Inventor: Michael A. Laskaris, Collegeville, PA (US)

(73) Assignee: HALE PRODUCTS, INC., Collegeville, PA (US)

( * ) Notice: Subject to any disclaimer, the term of this patent is extended or adjusted under 35 U.S.C. 154(b) by 599 days.

(21) Appl. No.: 18/207,946

(22) Filed: Jun. 9, 2023

(65) Prior Publication Data

US 2023/0398387 A1 Dec. 14, 2023

Related U.S. Application Data

(60) Provisional application No. 63/350,583, filed on Jun. 9, 2022.

(51) Int. Cl.

| | |
|---|---|
| ***A62C 27/00*** | (2006.01) |
| ***B60L 50/60*** | (2019.01) |
| ***F04B 17/03*** | (2006.01) |

(52) U.S. Cl.
CPC .............. *A62C 27/00* (2013.01); *B60L 50/66* (2019.02); *F04B 17/03* (2013.01); *B60L 2200/40* (2013.01)

(58) Field of Classification Search
CPC ......... A62C 27/00; B60L 1/003; B60L 50/66; B60L 2200/40; F04B 17/03
See application file for complete search history.

(56) References Cited

U.S. PATENT DOCUMENTS

| | | | |
|---|---|---|---|
| 6,357,532 | B1 | 3/2002 | Laskaris et al. |
| 6,991,041 | B2 | 1/2006 | Laskaris et al. |
| 8,162,619 | B2 | 4/2012 | Laskaris |
| 8,307,907 | B2 | 11/2012 | Laskaris et al. |
| 8,418,773 | B2 | 4/2013 | Cerrano |

(Continued)

FOREIGN PATENT DOCUMENTS

| | | | | |
|---|---|---|---|---|
| CN | 111450453 A | * 7/2020 | | A62C 27/00 |
| CN | 112140908 A | * 12/2020 | | A62C 27/00 |
| WO | 2021086923 A1 | 5/2021 | | |

*Primary Examiner* — Darren W Gorman
(74) *Attorney, Agent, or Firm* — Panitch Schwarze Belisario & Nadel LLP

(57) ABSTRACT

Briefly stated, one aspect of the present disclosure is directed to a firefighting apparatus. The firefighting apparatus includes a movable fire truck chassis and a battery array movable with the movable fire truck chassis and operatively connected to provide power for operating at least one pump of the firefighting apparatus. A pre-connect pump has a pre-connect inlet and a pre-connect outlet and is electrically powered by the battery array. A controller is operatively connected to the pre-connect pump and configured to control the pre-connect pump under a standby condition selected to maintain the firefighting apparatus in a state of readiness to pump firefighting fluid. The controller reduces a power-consumption rate of the pre-connect pump while maintaining the standby condition as compared to operating the pre-connect pump under an idle condition. The standby condition requires pumping by at least one pump within the firefighting apparatus for maintenance of the standby condition.

22 Claims, 3 Drawing Sheets

(56) References Cited

U.S. PATENT DOCUMENTS

| | | | | |
|---|---|---|---|---|
| 8,616,295 | B2 | 12/2013 | Laskaris et al. | |
| 10,286,237 | B2 | 5/2019 | Laskaris et al. | |
| 2005/0077057 | A1 | 4/2005 | Laskaris | |
| 2021/0107483 | A1* | 4/2021 | Shively | B60K 25/02 |
| 2022/0355140 | A1* | 11/2022 | Linsmeier | B60K 6/442 |
| 2022/0355690 | A1* | 11/2022 | Linsmeier | A62C 3/07 |
| 2023/0070769 | A1* | 3/2023 | Wheeler | H01M 10/6563 |
| 2023/0149754 | A1* | 5/2023 | Linsmeier | A62C 27/00<br>169/24 |
| 2023/0226395 | A1* | 7/2023 | Gee | H01R 13/5205<br>169/16 |

* cited by examiner

FIRE TRUCK CHASSIS WITH POWER-CONSERVING ELECTRIC PUMP SYSTEM

CROSS-REFERENCE TO RELATED APPLICATIONS

This application claims the benefit of priority under 35 USC § 119(e) of U.S. Provisional Patent Application No. 63/350,583 filed Jun. 9, 2022; and the contents of the application identified in this paragraph are incorporated into the present application by reference in their entirety.

BACKGROUND OF THE DISCLOSURE

The present disclosure relates generally to an electric fire truck chassis. The electric fire truck chassis is powered by a battery array for movement of the fire truck chassis (by driving). The electric fire truck chassis carries a pump for pumping firefighting agent or firefighting fluid (typically water, with or without fire-suppression foam) for firefighting. The pump is powered by the battery array.

A typical fire truck chassis has traditionally been powered by an internal-combustion engine, which provides power for movement of the fire truck chassis and may provide power to a pump carried by the fire truck chassis. The pump of such a fire truck chassis is typically powered via a conventional power takeoff operatively connected to the internal-combustion engine. Alternatively, a pump on a traditional fire truck chassis may be powered by a dedicated internal-combustion engine.

Electric fire truck chassis have recently become available and may become more prevalent over time. Under current technology, the time required to charge the battery array of an electric fire truck chassis to near capacity is longer than the fueling time of a fire truck chassis with an internal-combustion engine and a fuel tank. Furthermore, the battery array of an electric fire truck chassis may have a lower energy-storage capacity than a typical fuel tank in a fire truck chassis with an internal-combustion engine. The electric fire truck chassis and the electric pump system of the present disclosure may provide advantages over known electric fire truck chassis. These advantages may include efficient use and conservation of the energy-storage capacity of the battery array of the electric fire truck chassis through the disclosed pump system for use on the electric fire truck chassis. In some embodiments, the electric fire truck chassis may be a hybrid fire truck chassis, wherein a traditional internal combustion engine drives a generator to provide some battery re-charging capability. Aspects of the present disclosure would also provide advantages to a hybrid fire truck chassis, reducing the electrical load, increasing battery life, and reducing generator run-time requirements.

BRIEF SUMMARY OF THE DISCLOSURE

Briefly stated, one aspect of the present disclosure is directed to a firefighting apparatus. The firefighting apparatus includes a movable fire truck chassis and a battery array movable with the movable fire truck chassis and operatively connected to provide power for operating at least one pump of the firefighting apparatus. A pre-connect pump has a pre-connect inlet and a pre-connect outlet and is electrically powered by the battery array. A controller is operatively connected to the pre-connect pump and configured to control the pre-connect pump under a standby condition selected to maintain the firefighting apparatus in a state of readiness to pump firefighting fluid. The controller reduces a power-consumption rate of the pre-connect pump while maintaining the standby condition as compared to operating the pre-connect pump under an idle condition. The standby condition requires pumping by at least one pump within the firefighting apparatus for maintenance of the standby condition.

In another aspect, a method is disclosed for operating electrically powered pumps of a firefighting apparatus having a movable fire truck chassis and a battery array movable with the movable fire truck chassis. The battery array is operatively connected to provide power for at least one component of the firefighting apparatus. The firefighting apparatus has a drive motor carried by the movable fire truck chassis and operatively connected to drive movement of the movable fire truck chassis. The drive motor is operatively connected to receive power from the battery array. A pre-connect pump has a pre-connect inlet and a pre-connect outlet and is electrically powered by the battery array. The method comprises operating a controller, the controller being operatively connected to a pre-connect pump having a pre-connect inlet and a pre-connect outlet. The controller controls activation of the pre-connect pump under a standby condition selected to maintain the firefighting apparatus in a state of readiness to pump firefighting fluid, with the controller reducing a power-consumption rate of the pre-connect pump as compared to operating the pre-connect pump under an idle condition, while maintaining the standby condition, and with the standby condition requiring pumping by at least one of the electrically powered pumps for maintenance of the standby condition.

BRIEF DESCRIPTION OF THE SEVERAL VIEWS OF THE DRAWINGS

The following detailed description will be better understood when read in conjunction with the appended drawings. For the purpose of illustrating the invention, there are shown in the drawings various embodiments, including embodiments which may be presently preferred. It should be understood, however, that the invention is not limited to the precise arrangements and instrumentalities shown. In the drawings.

DETAILED DESCRIPTION

Figure 1:
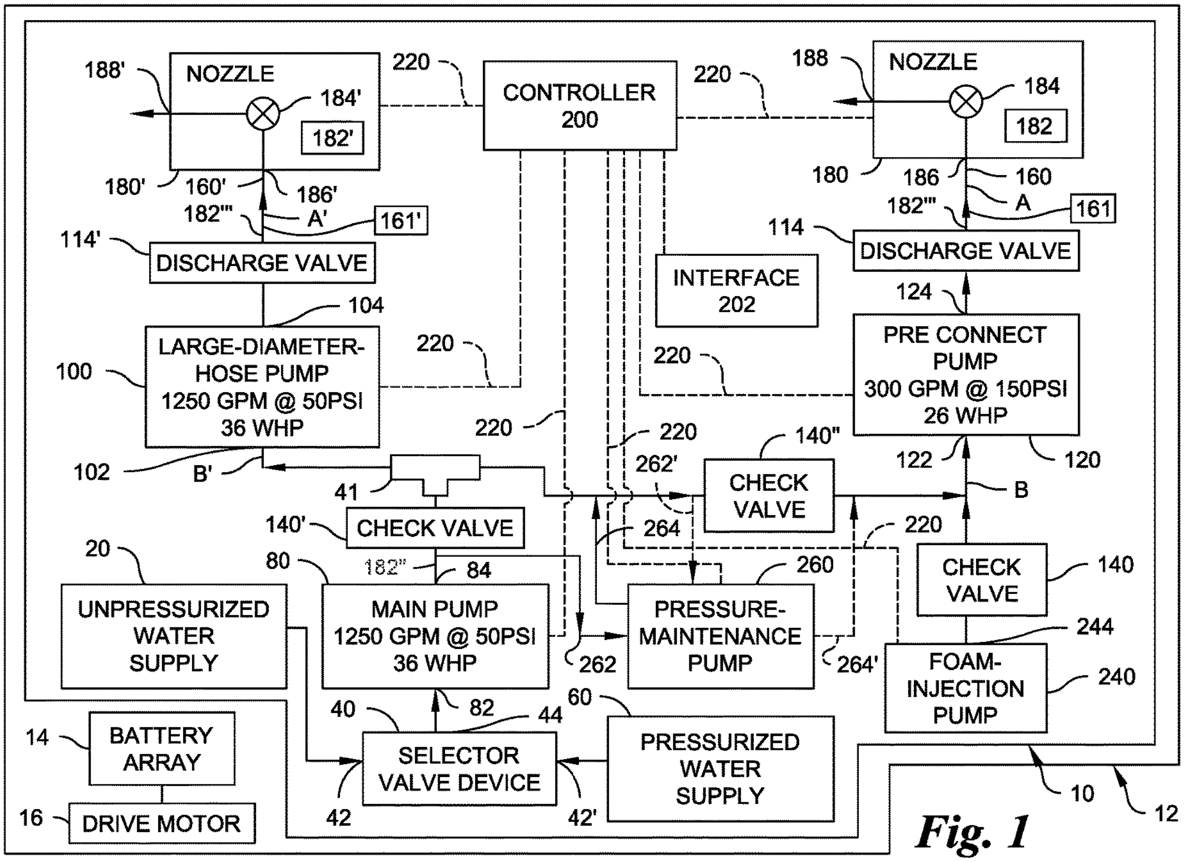
FIG. 1 is a schematic block diagram of a pump system and an electric fire truck chassis for a firefighting apparatus in accordance with an example embodiment.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of an object and designated parts thereof. Unless specifically set forth otherwise herein, the terms "a," "an," and "the" are not limited to one element but instead should be read as meaning "at least one." "At least one" may occasionally be used for clarity or readability, but such use does not change the interpretation of "a," "an," and "the." Moreover, the singular includes the plural, and vice versa, unless the context clearly indicates otherwise. As used herein, the terms "proximal" and "distal" are relative terms referring to locations or elements that are closer to (proximal) or farther from (distal) with respect to other elements, the user, or designated locations. "Including" as used herein means "including but not limited to." The word "or" is inclusive, so that "A or B" encompasses A and B together, A only, and B only. The terms "about," "approximately," "generally," "substantially," and like terms used herein, when referring to a dimension or characteristic of a component, indicate that the described dimension/characteristic is not a strict boundary or parameter and does not exclude minor variations therefrom that are functionally similar. At a maximum, such references that include a numerical parameter would include variations that, using mathematical and industrial principles accepted in the art (e.g., rounding, measurement or other systematic errors, manufacturing tolerances, etc.), would not vary the least significant digit thereof. "Battery array" includes any combination of one or more rechargeable batteries (including but not limited to lithium-ion, nickel-metal hydride, lead-acid, developed to date or hereafter) operatively connected to a movable fire truck chassis, or to one or more electrical components thereof, to provide energy storage. All of the batteries of a battery array may be adjacent to one another; or the batteries of the battery array may be divided among one or more locations and/or housed within one or more housings or units. "Firefighting fluid" refers to firefighting agent comprising liquid and/or foam and usable for firefighting and includes, but is not limited to, water (regardless of the presence of solid or liquid impurities therein) and mixtures of water with foams or foaming agents for firefighting. An "idle condition" is an operating condition requiring operation or rotation of an engine or pump, as when pumps or other devices are connected to an internal-combustion engine, which must run (idle) to maintain the system in a selected standby condition. Various pumps are designated herein as a main pump 80, a large-diameter-hose pump 100, a pre-connect pump 120, and a pressure-maintenance pump 260; these designations refer generally to the functions and roles of such pumps in the firefighting apparatus disclosed herein, rather than to specific characteristics that might be read into to each designation. The terminology set forth in this paragraph includes the words noted above, derivatives thereof, and words of similar import.

With respect to fire truck chassis in general, regardless of the power source thereof, fire-suppression hoses and nozzles and connected pump systems may spend a considerable amount of time in a standby condition. The standby condition is a zero-flow state or a near-zero-flow state or a low-flow state wherein firefighting fluid is not being discharged onto a fire—for example, during rescue, search, or setting up or breaking down suppression operations. The selected standby condition may be determined to maintain the firefighting apparatus in a state of readiness to pump firefighting fluid. While firefighting fluid is not being discharged onto a fire under the standby condition, the fire-suppression hoses and nozzles and connected pump systems may be kept ready to begin supplying firefighting fluid so that the firefighting apparatus can supply firefighting fluid quickly on demand. Although a slight delay of a few seconds in providing firefighting fluid upon demand may not cause an issue with a rigid fire hose, a delay may be critical if a lay-flat hose is used. A lay-flat hose, which collapses when not under pressure, may develop a kink resistant to flow within less than one second; so a firefighting apparatus for safe use with a flexible hose or a lay-flat hose may preferably maintain positive pressure to maintain the lay-flat hose in an expanded condition. As a result, a system with a lay-flat hose must be configured to supply firefighting fluid essentially immediately, within less than one second, or less than one-half second, or less than 0.1 second. If a rigid hose is being used, a short delay may not be an issue, and a pump system may be adequate if able to supply firefighting fluid within one to two seconds of detecting demand.

In one aspect, the present disclosure is directed to firefighting apparatus including a pump system 10 that may substantially reduce the energy used for pumping firefighting fluid in the standby condition (the zero-flow or near-zero-flow states) as compared to a traditional non-electric fire truck chassis with one or more pumps driven by one or more internal-combustion engines. The pump system 10 may be especially advantageous when including a plurality of pumps with varying capacities, allowing for the running of the most efficient pump or pumps for a particular use scenario.

In another aspect, the present disclosure is directed to firefighting apparatus including a pump system 10 and a movable fire truck chassis such as an electric fire truck chassis 12 that may provide more efficient pumping of firefighting fluid by providing one or more pumps 80, 100, 120, 260, with each pump 80, 100, 120, 260 including or powered by an electric motor and adapted and/or powered in a manner suited for particular use scenarios, rather than utilizing the approach used for pumping operations powered by an internal-combustion engine, where the internal-combustion engine must be run at a minimum idle speed, and where energy efficiency may be less critical. As noted more generally above, the electric fire truck chassis 12, which is powered by a battery array 14 (including at least one battery, as defined above), may have a lower energy-storage capacity than a traditional fire truck chassis powered by an internal-combustion engine. Further, a substantial recharge of the battery array 14 may take more time (and may be less conveniently available) than refueling of a traditional fire truck chassis. For at least these reasons, the energy-efficient pump system 10 may be particularly advantageous when used for an electric fire truck chassis 12.

In one aspect, referring to FIG. 1, a pump system 10 for an electric fire truck chassis 12 may include one or more of the following elements. A battery array 14 may be movable with, carried by, or incorporated into the electric fire truck chassis 12 and may be operatively connected to provide power for movement of the electric fire truck chassis 12 and for operating one or more pumps, control systems, and other components carried by the electric fire truck chassis 12. The electric fire truck chassis 12 has a drive motor 16 carried by the movable fire truck chassis 12 and operatively connected to drive movement of the movable fire truck chassis 12. The drive motor 16 is operatively connected to receive power from the battery array 14. Typically the drive motor 16 and battery array 14 are integrated into or permanently installed, or at least fixed, in the movable fire truck chassis. The pump system 10 may include one or more pumps 80, 100, 120, or 260—in some embodiments, one or more of each pump. Each pump 80, 100, 120, 260 may be a centrifugal pump or other type of pump adapted for pumping liquid (including liquid mixed with foam or solid impurities), with centrifugal pumps being the currently prevalent type of pump used on fire truck chassis. Each pump 80, 100, 120, 260 may be a close-coupled pump mounted to or including an electric motor, with the electric motor having sufficient torque to allow the pump to accelerate quickly in response to a signal or a demand for firefighting-fluid flow and/or pressure.

Continuing to refer to FIG. 1, the firefighting apparatus may include a pre-connect pump 120 having a pre-connect inlet 122 and a pre-connect outlet 124. As noted above, the pre-connect pump 120 may be an electrically powered pump incorporating an electric motor and operatively connected to be powered by the battery array 14. A discharge valve 114 may be fluidly connected to and configured to control flow from the pre-connect pump 120 passing through the pre-connect outlet 124. The discharge valve 114 may be controlled manually, by motors or other powered actuators, or by a controller 200.

As shown in FIG. 1, the pre-connect pump 120 may be fluidly connected for supplying firefighting fluid to a nozzle 180 through a hose 160, which may be a lay-flat hose that collapses when not under positive pressure. Alternatively, the hose 160 may be a non-collapsible or booster-type hose that retains a round shape or other expanded shape, even when not under pressure. The nozzle 180 may receive firefighting fluid through an inlet 186 thereof and may discharge firefighting fluid through a discharge 188 thereof. The nozzle 180 may include or be operatively connected to a nozzle valve 184, which may in turn be operatively connected to a bail, lever, handle, or other mechanism (not shown) for opening and closing the nozzle valve 184 and thereby controlling flow of firefighting fluid through the nozzle 180. The pre-connect pump 120 may be capable of supplying, for example, about 330 GPM (gallons per minute) of firefighting fluid at a pressure of 150 psi, consuming a maximum of, for example, about 26 WHP (water horsepower). Optionally, the pre-connect pump 120, rather than providing firefighting fluid to a single hose-nozzle combination such as the hose 160 and the nozzle 180, may be connected to a manifold (described below), which may be fluidly connected with the pre-connect outlet 124 of the pre-connect pump 120—for example, at location A of FIG. 1. The manifold at location A, if present, may be used to direct firefighting fluid to one or more additional hoses and nozzles. The pre-connect pump 120 may preferably be a non-positive-displacement pump (such as a centrifugal pump) configured to allow water to pass through the pre-connect pump 120 when the pre-connect pump 120 is not activated.

Continuing to refer to FIG. 1, the firefighting apparatus may include a pressure-maintenance pump 260 having a pressure-maintenance inlet 262 and a pressure-maintenance outlet 264 in fluid communication with the pre-connect inlet 122, the pressure-maintenance pump 260 being electrically powered. The pressure-maintenance pump 260 may be a positive-displacement pump or a non-positive displacement pump. A pressure-maintenance check valve 140" may be provided in fluid communication with the pressure-maintenance pump 260 and the pre-connect inlet 122 and configured to prevent backward flow through the pressure-maintenance pump 260. In the embodiment shown with connections in solid lines in FIG. 1, the pressure-maintenance inlet 262 may be connected to draw firefighting fluid upstream of the main check valve 140', which is introduced and discussed below, and the pressure-maintenance outlet 264 may discharge firefighting fluid downstream of the main check valve 140' and upstream of the pressure-maintenance check valve 140", regardless of whether other components such as the tee connector 41 and components connected to the left side thereof are present or are omitted. In an alternative embodiment with connections shown in dotted lines in FIG. 1, the pressure-maintenance pump 260 may have a pressure-maintenance inlet 262' connected to draw firefighting fluid upstream of the pressure-maintenance check valve 140" and to discharge firefighting fluid downstream of the pressure-maintenance check valve 140" through a pressure-maintenance outlet 264'. In the alternative embodiment, an additional check valve (not shown) may be provided downstream of the pressure-maintenance outlet 264' to prevent backward flow through the pressure-maintenance pump 260.

The controller 200 may be operatively connected to the pressure-maintenance pump 260 and the pre-connect pump 120 and configured to control the pressure-maintenance pump 260 and the pre-connect pump 120 under the standby condition while reducing a combined power-consumption rate of the pre-connect pump 120 and the pressure-maintenance pump 260 as compared to operating the pre-connect pump 120 under the idle condition. In another embodiment, the controller 200 may be operatively connected to the pressure-maintenance pump 260 and/or the pre-connect pump 120 and configured to control the pressure-maintenance pump 260 to maintain the standby condition while operating only the pressure-maintenance pump 260. The pressure-maintenance pump 260 may have a pressure-maintenance power consumption to maintain the standby condition, and the pressure-maintenance power consumption may be less than a pre-connect minimum power consumption required to operate the pre-connect pump 120 to maintain the standby condition.

Continuing to refer to FIG. 1, the firefighting apparatus may include a main pump 80 having a main inlet 82 and a main outlet 84. The main pump 80 may preferably be a non-positive-displacement pump (such as a centrifugal pump) configured to allow water to pass through the main pump 80 when the main pump 80 is not activated. The main outlet 84 may be in fluid communication with the pre-connect inlet 122. The main pump 80 may be an electrically powered pump incorporating an electric motor as described above. The main pump 80 may be configured and operatively connected to receive power from the battery array 14. The controller 200 may be operatively connected to the pressure-maintenance pump 260, the pre-connect pump 120, and the main pump 80 and configured to control the pressure-maintenance pump 260, the pre-connect pump 120, and the main pump 80 under the standby condition while reducing a combined power-consumption rate of the pressure-maintenance pump 260, the pre-connect pump 120, and the main pump 80 as compared to operating the main pump 80 or the pre-connect pump 120 under the idle condition.

A selector-valve device 40 may comprise a single three-way valve configured to allow the main pump 80 to be fluidly connected to a selection of either of two sources of firefighting fluid—for example, an unpressurized water supply 20 or a pressurized water supply 60. Alternatively, the selector-valve device 40 may comprise two valves, each configured to control a fluid connection to a respective one of the unpressurized water supply 20 and the pressurized water supply 60. The selector-valve device 40 has a first selector inlet 42 and a second selector inlet 42' and a selector outlet 44. The selector outlet 44 is in fluid communication with the main inlet 82, and the selector inlets 42, 42' may be configured to be connected in fluid communication with an unpressurized supply of firefighting fluid such as the unpressurized water supply 20, or a pressurized supply of firefighting fluid such as the pressurized water supply 60. The controller 200 may receive firefighting-fluid-supply data indicating a connection of the unpressurized water supply 20 or the pressurized water supply 60 in fluid communication with the selector outlet 44. The controller 200 may be configured to control the pressure-maintenance pump 260, the pre-connect pump 120, the large-diameter-hose pump 100, and/or the main pump 80 based in part on the firefighting-fluid-supply data.

The unpressurized water supply 20 may be, for example, a water tank carried on the electric fire truck chassis 12, or another unpressurized source of firefighting fluid such as a water tank not carried on the electric fire truck chassis 12, or a river, or a pond. The pressurized water supply 60 may include a fire hydrant, a piping system, or another pressurized system supplying water under pressure (typically at about 50-100 psi). Based on the setting of the selector-valve device 40 (for example, two or more selector valves, where present), the unpressurized water supply 20 or the pressurized water supply 60 may be fluidly connected to the main pump 80, which may be installed on the electric fire truck chassis 12 and may be capable of supplying a substantial flow of firefighting fluid—for example, about 1250 GPM (gallons per minute) at a pressure of 50 psi, while consuming a maximum of, for example, about 36 WHP (water horsepower). For reference, water horsepower may be computed as the product of pressure (psi) and flow rate (gallons per minute), divided by 1714 (a unit-conversion factor). The main pump 80 may receive firefighting fluid through a main inlet 82 thereof and may discharge firefighting fluid through main outlet 84 thereof. A main check valve 140' may be operatively connected in fluid communication with the main outlet 84 and the pre-connect inlet 122 and may be configured to prevent back flow through the main pump 80. This arrangement enables a pressure-maintenance pump 260 (discussed below) to maintain pressure without causing backward flow through the main pump 80. Where the pressurized water supply 60 is available and selected, the main pump 80 may be controlled to run at a selected speed, which may be the lowest speed compatible with flow and pressure requirements of any discharge nozzles and related fluid connections in fluid communication with the main outlet 84 of the main pump 80, which are discussed below. If the pressurized water supply 60 provides sufficient pressure for the selected discharge nozzles and related fluid connections, then the main pump 80 may run only as needed (slowly and/or intermittently, to limit, reduce, or minimize power usage), or the main pump 80 may not run at all (for a particular water supply 60).

Continuing to refer to FIG. 1, the firefighting apparatus may include a large-diameter-hose pump 100 having a large-diameter-hose inlet 102 and a large-diameter-hose outlet 104 in fluid communication with the pre-connect inlet 122. The large-diameter-hose pump 100 may be electrically powered. The large-diameter-hose pump 100 may preferably be a non-positive-displacement pump (such as a centrifugal pump) configured to allow firefighting fluid to pass through the large-diameter-hose pump 100 when the large-diameter-hose pump 100 is not activated. A discharge valve 114' may be fluidly connected to and configured to control flow from the large-diameter-hose pump 100 passing through the large-diameter-hose outlet 104. The discharge valve 114' may be controlled manually, by motors or other powered actuators, or by the controller 200. The controller 200 may be operatively connected to the pressure-maintenance pump 260, the pre-connect pump 120, and the large-diameter-hose pump 100 and configured to control the pressure-maintenance pump 260, the pre-connect pump 120, and the large-diameter-hose pump 100 under the standby condition while reducing a combined power-consumption rate of pressure-maintenance pump 260, the pre-connect pump 120, and the large-diameter-hose pump 100 as compared to operating the large-diameter-hose pump 100 under an idle condition.

Continuing to refer to FIG. 1, the firefighting apparatus may include the pressure-maintenance pump 260, the pre-connect pump 120, the large-diameter-hose pump 100, and the main pump 80, or any subset thereof. The controller 200 may be operatively connected to the pressure-maintenance pump 260, the pre-connect pump 120, the large-diameter-hose pump 100, and the main pump 80 and configured to control the pressure-maintenance pump 260, the pre-connect pump 120, the large-diameter-hose pump 100, and the main pump 80 under the standby condition while reducing a combined power-consumption rate of the pressure-maintenance pump 260, the pre-connect pump 120, the large-diameter-hose pump 100, and the main pump 80 as compared to operating one or more of the pumps, for example the large-diameter-hose pump 100, under the idle condition.

Referring again to FIG. 1, firefighting fluid exiting the main pump 80 through the main outlet 84 may pass through a tee connector 41 providing a fluid connection to additional pumps—for example, to the large-diameter-hose pump 100 or the pre-connect pump 120. A discharge valve 114' may be fluidly connected to the large-diameter-hose outlet 104 of the large-diameter-hose pump 100. A discharge valve 114 may be fluidly connected to the pre-connect outlet 124 of the pre-connect pump 120. The discharge valves 114, 114' may be controlled manually, by motors or other powered actuators, or by the controller 200.

As shown in FIG. 1, the pre-connect pump 120 may be fluidly connected for supplying firefighting fluid to a nozzle 180 through a hose 160, which may be a lay-flat or collapsible hose that collapses when not under positive pressure. Alternatively, the hose 160 may be a non-collapsible or booster-type hose that retains a round shape or other expanded shape even when not under pressure. The nozzle 180 may receive firefighting fluid through an inlet 186 thereof and may discharge firefighting fluid through a discharge 188 thereof. The nozzle 180 may include or be operatively connected to a nozzle valve 184, which may in turn be operatively connected to a bail, lever, handle, or other mechanism (not shown) for opening and closing the nozzle valve 184 and thereby controlling flow of firefighting fluid through the nozzle 180. The pre-connect pump 120 may have a pre-connect inlet 122 and a pre-connect outlet 124 and may be capable of supplying, for example, about 330 GPM (gallons per minute) of firefighting fluid at a pressure of 150 psi, consuming a maximum of, for example, about 26 WHP (water horsepower). Optionally, the pre-connect pump 120, rather than providing liquid to a single hose-nozzle combination such as the hose 160 and the nozzle 180, may be connected to a manifold (described below), which may be fluidly connected with the pre-connect outlet 124 of the pre-connect pump 120—for example, at location A of FIG. 1. The manifold at location A, if present, may be used to direct firefighting fluid to one or more additional hoses and nozzles.

A discharge valve 114 may be operatively connected between the pre-connect outlet 124 of the pre-connect pump 120 and the hose 160. In an embodiment wherein the hose 160 is a lay-flat hose, the discharge valve 114 may serve to trap pressure in the hose 160, allowing the hose 160 to remain in the expanded state without receiving pressurized firefighting fluid from the pre-connect pump 120, or by receiving a reduced supply of pressurized firefighting fluid from the pre-connect pump 120—in either case, contributing to reduced power usage by the pre-connect pump 120 and preservation of the charge of the battery array 14. Similarly, a discharge valve 114' may be operatively connected between the large-diameter-hose outlet 104 of the large-diameter-hose pump 100 and the hose 160'. In an embodiment wherein the hose 160' is a lay-flat hose (collapsible hose), the discharge valve 114' may serve to trap pressure in the hose 160', allowing the hose 160' to remain in the expanded state without receiving pressurized firefighting fluid from the large-diameter-hose pump 100, or by receiving a reduced supply of pressurized firefighting fluid from the large-diameter-hose pump 100—in either case, contributing to reduced power usage by the large-diameter-hose pump 100 and preservation of the charge of the battery array 14.

An accumulator 161 may be operatively connected between the pre-connect outlet 124 of the pre-connect pump 120 and the hose 160—for example, downstream from the discharge valve 114 in fluid communication with the nozzle 180. The accumulator 161 may provide fluid pressure or fluid flow upon a pressure drop or fluid movement at the accumulator 161. Similarly, an accumulator 161' may be operatively connected between the large-diameter-hose outlet 104 of the large-diameter-hose pump 100 and the hose 160'—for example, downstream from the discharge valve 114' in fluid communication with the nozzle 180'. The accumulator 161' may provide fluid pressure or fluid flow upon a pressure drop or fluid movement at the accumulator 161'.

Figure 3:
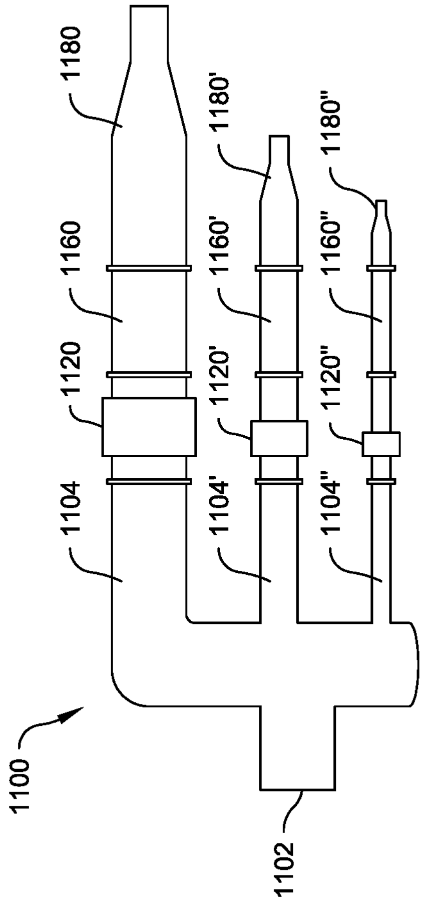
FIG. 3 is a schematic diagram of a manifold and connected components suitable for use in a pump system of the type shown in FIG. 1.

Referring to FIG. 3, an example of a manifold 1100 has an inlet 1102 fluidly connected to a plurality of outlets 1104, 1104', 1104", which may respectively be fluidly connected to a plurality of hoses 1160, 1160', 1160"; a plurality of nozzles 1180, 1180', 1180"; and optionally a plurality of pumps 1120, 1120', 1120". Each pump 1120, 1120', 1120" may comprise or be formed as a single unit with a discharge valve for controlling flow therethrough. The hoses 1160, 1160', 1160"; the pumps 1120, 1120', 1120" (where present); and the nozzles 1180, 1180', 1180" connected to the manifold 1100 may be the same or may differ from one another in size, configuration, and capacity, as shown in FIG. 3; alternatively, they may be identical. The manifold 1100 may allow the main pump 80 or the pre-connect pump 120 to supply one or more additional pre-connect pumps serving additional hoses and nozzles and operating in parallel with, or as an alternative to, or in addition to, the pre-connect pump 120.

Referring again to FIG. 1, the large-diameter-hose pump 100 (LDH pump) may, for example, be capable of supplying a substantial flow of firefighting fluid and may in some embodiments be capable of supplying essentially the same flow of firefighting fluid as the main pump 80—about 1250 GPM (gallons per minute) at a pressure of 50 psi, consuming a maximum of, for example, about 36 WHP (water horsepower). The large-diameter-hose pump 100 may feed (directly or with additional intervening components such as manifolds and additional hoses) at least one nozzle 180' through a large-diameter hose 160'. As noted above, the discharge of the large-diameter-hose pump 100 may include the discharge valve 114', which may be configured to control the discharge of the large-diameter-hose pump 100. The nozzle 180' may receive firefighting fluid through an inlet 186' thereof and may discharge firefighting fluid through a discharge 188' thereof. The nozzle 180' may include or may be fluidly connected to a nozzle valve 184', which may in turn be operatively connected to a bail, lever, handle, or other mechanism (not shown) for opening and closing the nozzle valve 184'. Optionally, the large-diameter-hose pump 100, rather than providing firefighting fluid to a single hose 160' and nozzle 180', may be connected to a manifold (again, see FIG. 3 for an example), which may be disposed in fluid communication with the outlet of the large-diameter-hose pump 100—for example, at location A' of FIG. 1. The manifold at location A', if present, may receive the output of the main pump 80 and supply the output to one or more additional hoses and nozzles by way of the manifold. Alternatively or in addition, a manifold may be provided at location B or location B' of FIG. 1 and may receive the output of the main pump 80 and supply one or more additional pumps, each serving an additional hose and nozzle, with such additional pumps and operating in parallel with, or as an alternative to, or in addition to, the large-diameter-hose pump 100. See FIG. 3 for an example of a manifold 1100 and connected hoses 1160, 1160', 1160"; pumps 1120, 1120', 1120" (where present); and the nozzles 1180, 1180', 1180". A sensor 182, 182' or the nozzle 180, 180' may provide demand data and may be operatively connected to sense an operating state of the nozzle 180 or the nozzle 180'. The controller 200 may be configured to control the pressure-maintenance pump 260, the pre-connect pump 120, the large-diameter-hose pump 100, and/or the main pump 80 based in part on the demand data.

Referring again to FIG. 1, the pump system 10 may include a foam-injection pump 240 connected at a suitable position—for example, downstream of the main pump 80 between the main pump 80 and the pre-connect pump 120, in fluid connection with the pre-connect inlet 122. The foam-injection pump 240 may have an inlet (not shown) connected to a foam supply (not shown), which may be a supply of firefighting foam or agents for generating firefighting foam, and may have a foam-injection outlet 244. A foam-injection check valve 140 may be operatively connected in fluid communication with the foam-injection outlet 244 to prevent backward flow through the foam-injection pump 240. The foam-injection pump 240 may also be configured and operatively connected to receive power from the battery array 14. The foam-injection check valve 140 may be operatively connected in fluid communication with the outlet 244 of the foam-injection pump 240 and the outlet 264 of the pressure-maintenance pump 260 to prevent back flow through the foam-injection pump 240. The pressure-maintenance check valve 140" may be provided to prevent foam from the foam-injection pump 240 from entering the large-diameter-hose pump 100. The foam-injection pump 240 may be controlled to use and conserve power from the battery array 14 in the manner described herein for the other pumps connected thereto. For example, the controller 200 may be operatively connected to the foam-injection pump 240 and configured to control the foam-injection pump 240 to run and to pump and inject foam only when firefighting fluid is flowing through the pre-connect pump 120.

Continuing to refer to FIG. 1, the pump system 10 includes the controller 200. The controller 200 may comprise a programmable logic controller (PLC), a microprocessor, or any other device capable of receiving and evaluating inputs and providing outputs based on programming or configuration thereof. The controller 200 may include one or more timers, storage locations, or processors as needed to perform the functions described herein. The controller 200 may be operatively connected to any of the valves, for example, to the discharge valve 114 or the discharge valve 114', so that the controller 200 controls the opening and closing of the discharge valve 114, 114'. The controller 200 may be operatively connected to the pumps and the valves to control the operation thereof. The controller 200 may include a pump-control scheme, which may include a timer, counter, calculated table, lookup-table entry, or the like that provides for control outputs for controlling valves or pumps, the control outputs being correlated with a demand for pumping that is consistent with firefighting requirements (including conditions required or selected for standby) while minimizing or limiting power usage in maintaining such conditions.

The controller 200 may be operatively connected to and may control the operation of the main pump 80, the pre-connect pump 120, the large-diameter-hose pump 100, and the foam-injection pump 240 for efficient use of the battery array 14, based on conditions within the pump system 10 and demand for firefighting fluid and/or a lack of demand for firefighting fluid. The controller 200 may be operatively connected to the pre-connect pump 120 and configured to control the pre-connect pump 120 under a standby condition selected to maintain the firefighting apparatus in a state of readiness to pump firefighting fluid, with the controller 200 reducing a power-consumption rate of the pre-connect pump 120 while maintaining the standby condition as compared to operating the pre-connect pump 120 under an idle condition as noted above, requiring continuous operation or rotation of the pre-connect pump 120 as in a conventional arrangement including an internal-combustion engine, wherein the standby condition requires pumping by at least one pump within the firefighting apparatus for maintenance of the standby condition.

The controller 200 may be operatively connected to an interface 202, which may be a touch screen, keyboard, switch or switches, or other input device capable of providing input to the controller 200. The interface 202 may be used to provide information to the controller 200 regarding the available firefighting fluid source(s) and/or the desired flow through any connected nozzles and other devices comprising the pump system 10. The controller 200 may be operatively connected to a firefighting-fluid-demand sensor 182, 182', which may be a sensor capable of detecting demand for firefighting fluid to be supplied to a nozzle such as the nozzle 180, 180'. The firefighting-fluid-demand sensor 182, 182' may be operatively connected to, or included with, the corresponding nozzle 180, 180'. For example, the firefighting-fluid-demand sensor 182, 182' may comprise a nozzle-valve-position sensor operatively connected to a nozzle valve 184 of the nozzle 180 to detect an operating position thereof directly. The firefighting-fluid-demand sensor 182, 182' may alternatively detect the operating position of the nozzle valve 184, 184' by being operatively connected to detect an operating position of a bail, lever, handle, or other mechanism used to open and close the nozzle valve 184, 184'. Alternatively, the firefighting-fluid-demand sensor 182, 182' may comprise a flow switch or a flowmeter sensor detecting flow of firefighting fluid through the nozzle valve 184, 184' or hoses 160, 160' or other hoses, pipes, or fluid connections providing firefighting fluid thereto. Still further alternatively, the firefighting-fluid-demand sensor 182, 182' may be a sensor configured to detect a pressure drop through an orifice of the nozzle 180, 180' or through an orifice fluidly connected to the nozzle 180, 180' or in any of the hoses or fluid connections providing firefighting fluid thereto, or through the nozzle valve 184, 184'. A firefighting-fluid-demand sensor 182''' may be positioned and configured to detect a pressure drop through a discharge valve 114, 114' and may provide information indicating a demand for firefighting fluid to the controller 200. A firefighting-fluid-demand sensor 182" may be positioned at main outlet 84 and configured to detect flow from the main pump 80 and to provide information indicating a demand for firefighting fluid to the controller 200.

Continuing to refer to FIG. 1, the controller 200 may be operatively connected to each firefighting-fluid-demand sensor 182, 182', 182", 182''' and with each pump by, for example, a wired connector or by a wireless connection 230. Each wireless connection 230 may comprise one or more transceiver modules that may communicate based on Wi-Fi, Bluetooth®, and/or other wireless communication protocols. The controller 200 may also be operatively connected to control one or more of the pre-connect pump 120 or the main pump 80 to improve or maximize the efficiency of the pump system 10 by running the pump or pumps requiring the least or lesser power to maintain the pump system 10 in the standby condition, ready to pump firefighting fluid on demand. The controller 200 may also be operatively connected to control one or more of the large-diameter-hose pump 100 or the main pump 80 to improve or maximize the efficiency of the pump system 10 by running the pump or pumps requiring the least power, or at least reduced power, to maintain the pump system 10 in a standby condition, ready to pump firefighting fluid on demand. For example, the controller 200 may be operatively connected to sensors such as the firefighting-fluid-demand sensors 182, 182', 182", 182''' providing one or more demand data indicating a demand for pumping firefighting fluid; and the controller 200, upon receiving the one or more demand data, may activate pumps in any suitable combination to meet the demand for pumping firefighting fluid. For example, the controller 200 may activate only pre-connect pump 120; or the controller 200 may activate one or more of the pre-connect pump 120, the large-diameter-hose pump 100, or the main pump 80. A total power consumption of the activated pump or pumps of the pre-connect pump 120, the large-diameter-hose pump 100, and the main pump 80 may preferably be less than a total power consumption of the pre-connect pump 120, the large-diameter-hose pump 100, and the main pump 80 when the pre-connect pump 120, the large-diameter-hose pump 100, and the main pump 80 are activated concurrently.

Maintaining the pump system 10 in the standby condition may require maintaining appropriate pressure in the pump system 10 to maintain the hose 160 in a ready state—preferably in an expanded, pressurized, non-flat state, where the hose 160 is a lay-flat hose. Alternatively, maintaining the pump system 10 in a second standby condition may require maintaining a particular pressure compatible with rapid acceleration of a discharge pump such as the pre-connect pump 120. The pump system 10 may include the pressure-maintenance pump 260, which may be a small-capacity electric pump with an inlet 262 and an outlet 264. The pressure-maintenance pump 260 and may be operatively connected to the battery array 14 and to the controller 200 and may be operated to maintain sufficient pressure to maintain the standby condition in the hose 160, where the hose 160 is a lay-flat hose, to maintain the lay-flat hose in an expanded state. Then, when a nozzle such as the nozzle 180 is opened, a larger electric pump such as the pre-connect pump 120 may be brought up to speed to provide an appropriate flow of firefighting fluid. As a potential further measure to reduce energy consumption, the hose 160 may be a non-collapsible or booster-type hose that retains a round shape or another expanded shape even when not under pressure, with the result being that the pressure in the hose 160 in the standby condition, and therefore the power consumed in maintaining pressure in the hose 160 in the standby condition, are further reduced. Alternatively, the hose 160 may be a lay-flat hose requiring a lower-than-standard standby pressure to maintain its expanded, noncollapsed state; such a hose 160 would also result in reduced standby pressure and reduced energy consumption as compared to a standard lay-flat hose.

In use, referring to FIG. 1, the pump system 10 may be carried on an electric fire truck chassis 12. The pump system 10 may be connected to a firefighting fluid source as described above. The controller 200 may control the operation of the pump system 10. The controller 200 generally may be operated according to input received from the interface 202, with such input generally corresponding to the firefighting fluid source, a desired flow of firefighting fluid and pressure when firefighting fluid is demanded, and a desired standby condition to be maintained when firefighting fluid is not demanded. The interface 202 and/or the controller 200 may include preset configurations corresponding to expected use cases of the pump system 10, with each use case being a particular combination of available firefighting fluid input (source), desired firefighting fluid output, elevation changes, fire-hose lengths, types and numbers of nozzles, and the like.

Figure 2:
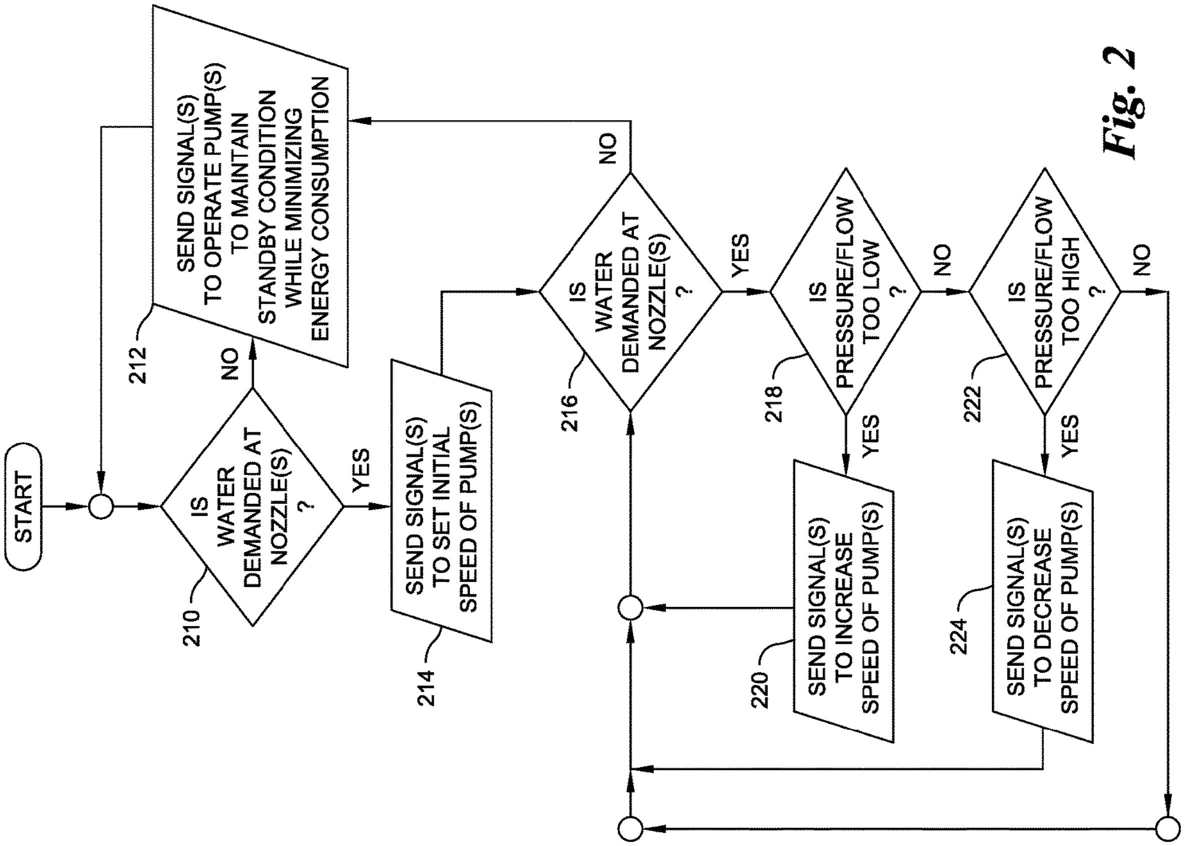
FIG. 2 is a flow chart depicting the operation of an embodiment of an example of a control system for a pump system of the type shown in FIG. 1.

Referring to FIG. 2, the controller 200 of FIG. 1 may operate in the context of the firefighting systems disclosed herein according to the following example set of method steps. The controller 200 may start a control program (START) and proceed to step 210, evaluating whether firefighting fluid is being demanded at one or more of the nozzles 180, 180', or is demanded at other locations in the pump system 10 as a result of, for example, leakage or the filling of a lay-flat hose 160 or an accumulator 161. This evaluation may be based on information from the nozzle-valve-position sensor or other firefighting-fluid-demand sensor 182, 182', or on a pressure drop at the outlet of any of the discharge valves 114, 114'; or at a location common to the discharge of the main pump 80 and the intakes of the large-diameter-hose pump 100 and the pre-connect pump 120, so that if flow occurs within the pump system 10, the fact of such flow factors into the operation of the controller 200. If the controller 200 determines that firefighting fluid is not being demanded at any of the nozzles, then the controller 200 may proceed to step 212 and send signals to operate one or more of the main pump 80, the large-diameter-hose pump 100, and the pre-connect pump 120, or the pressure-maintenance pump 260 to maintain the standby condition. After sending any necessary signals in step 212, the controller 200 returns to step 210 and evaluates demand for firefighting fluid, which is water in the example of FIG. 2; note that the method steps of FIG. 2 are compatible with any firefighting fluid. Thus the controller 200 may be programmed or configured to send signals to maintain, for example, a minimum pressure or a minimum flow rate (with minimum flow occurring through hose leakage, a relief valve, or the like) by running the most efficient pump, or at least a fairly efficient pump, for the task, which may in some embodiments be the smallest pump capable of the task. For example, the pressure-maintenance pump 260 may be a small pump that is efficient at very low flow rates and that is used to maintain standby pressure or the standby condition. Where no pressure-maintenance pump 260 is provided, another pump such as the pre-connect pump 120, or even the main pump 80, may be operated at a very low speed in order to conserve power. For example, where the nozzle-valve-position sensor or other firefighting-fluid-demand sensor 182, 182' detects that there is no demand for firefighting fluid at the nozzle 180, the controller 200 may stop the main pump 80 entirely, or may run the main pump 80 slowly (for example, near zero rpm) and/or intermittently, so that a minimum standby pressure is maintained between the main pump 80 and any pump(s) receiving the output of the main pump 80—for example, the large-diameter-hose pump 100 or the pre-connect pump 120.

Continuing with the flow chart of FIG. 2, if the controller 200 receives a signal from a firefighting-fluid-demand sensor such as the firefighting-fluid-demand sensor 182, 182' indicating that there is demand for firefighting fluid at one or more of the nozzles 180, 180', then the controller 200 may proceed to step 214 and send signals to run the pre-connect pump 120 and/or the main pump 80 and/or the large-diameter-hose pump 100 at an initial speed, preferably selected to match the demand for firefighting fluid approximately, based on known conditions. In response to a signal from a nozzle-valve-position sensor or other firefighting-fluid-demand sensor 182, 182' that no flow of firefighting fluid is needed at the nozzle 180, 180', the controller 200 may stop the pre-connect pump 120 (and may run the pressure-maintenance pump 260, where present), or may run the pre-connect pump 120 slowly, seeking to minimize, reduce, or limit the power used to maintain the standby condition, and may return to step 210. Note that if the hose 160 is a modern lay-flat fire hose, the hose 160 may be flexible and may expand and serve as an accumulator, with an electric pump such as the pressure-maintenance pump 260 being able to be run just fast enough to maintain the specified pressure to maintain the standby conditions in the hose 160 without consuming energy unnecessarily. The hose 160, acting as an accumulator, may provide some pressure and resulting flow of firefighting fluid for a brief period following opening of one more of the nozzles 180, 180'. In addition to the accumulator effect of the hose 160, a conventional hydraulic accumulator 161—for example, an accumulator 161 of the weight-loaded piston type, diaphragm (or bladder) type, spring type, or the hydro-pneumatic piston type—may be operatively connected to the hose 160 or otherwise operatively connected to one or more of the nozzles 180, 180' to provide pressure and flow immediately upon demand for firefighting fluid, between a firefighting-fluid-demand time when firefighting fluid is demanded and a pump-operation time when the system initiates pump operation to provide the demanded firefighting fluid. When a nozzle valve 184, 184' is opened or a firefighting-fluid-demand sensor 182, 182' detects a demand for firefighting fluid, then a larger pump 80, 120, 260 may be activated or accelerated to increase flow. As noted above, a sufficiently quick response is needed to maintain pressure in the hose 160, 160' especially where the hose 160, 160' is a lay-flat hose that might collapse if pressure drops too low.

After completing step 214, the processor 200 can perform step 216, which is an additional evaluation of whether firefighting fluid is demanded at one or more nozzles. At step 216, the controller 200 may evaluate demand for firefighting fluid (water) based on a signal from a nozzle-valve-position detector, or based on a pressure drop across any nozzle, or based on a signal from a flow meter or flow sensor, or the like. When there is demand for firefighting fluid at a nozzle such as the nozzle 180, 180', and one or more pumps are in operation, the controller 200 may evaluate at step 218 (and may do so repeatedly) the flow of firefighting fluid available at any nozzle where flow of firefighting fluid is demanded—for example, at nozzle 180, 180'. The flow of firefighting fluid may be evaluated by determining or estimating the flow of firefighting fluid based on one or more measured quantities, such as pressure readings at various locations in the system. The flow evaluation may include an intermediate determination or calculation of the flow of firefighting fluid, with the adequacy of the flow being determined by comparing the estimated or computed flow rate to the desired flow rate. The flow of firefighting fluid may be computed or estimated based on a pressure reading at one or more locations in the pump system 10, in combination with a known arrangement (connected hoses and devices) and state (valves open and closed) of the system. If the controller 200 evaluates the flow of firefighting fluid as being too low (based on one or more of the measured quantities being too low), then the controller 200 may proceed to step 220 and send one or more signals to increase the speed of one or more pumps fluidly or operatively connected to the flow being detected in evaluating the flow of firefighting fluid. If the flow of firefighting fluid is not evaluated as being too low at step 218, the controller 200 may evaluate at step 222 whether the flow of firefighting fluid is too high. If the flow of firefighting fluid is evaluated at step 222 by the controller 200 as being too high (based on one or more of the measured quantities being too high), then the controller 200 may proceed to step 224 and send one or more signals to decrease the speed of one or more pumps fluidly or operatively connected to the flow being detected in evaluating the flow of firefighting fluid. The controller 200 may then return to step 216 and again evaluate whether firefighting fluid is demanded at a nozzle or other location in the firefighting apparatus. Alternatively or in addition, the controller 200 may evaluate the adequacy of a flow of firefighting fluid based on one or more measurements of pressure and/or another direct measurement, determining appropriate signals to control the pumps based on measurements of pressure or other measured quantity, rather than computing or estimating fluid flow as an intermediate step before determining the adequacy of the flow of firefighting fluid. The flow evaluation may thus be performed by comparing one or more measured pressures to one or more selected pressures, which are selected to provide a desired flow of firefighting fluid, without an intermediate determination or calculation of the flow of firefighting fluid.

As shown in FIG. 2, if the controller 200 detects flow or pressure or other measured quantity (collectively "flow") of firefighting fluid as being too low and sends signal(s) to increase pump speed, the controller 200 may return to step 216 and evaluate again whether firefighting fluid is demanded at any nozzles before returning to step 218 evaluate whether the flow of firefighting fluid is too low. Similarly, if the controller 200 detects flow of firefighting fluid as being too high at step 222 and sends signal(s) to decrease pump speed at step 224, the controller 200 may again evaluate whether firefighting fluid is demanded at any nozzles at step 216 before returning to step 218 to evaluate whether the flow of firefighting fluid is too low. Finally, if the controller 200 detects flow of firefighting fluid as being not too high and not too low at steps 218 and 222, the controller 200 may again evaluate at step 216 whether firefighting fluid is demanded at any nozzles before returning to evaluate whether the flow of firefighting fluid is too low. An aspect of this iterative process of evaluating flow of firefighting fluid and adjusting pump speed(s) is that the controller 200, by calculation, use of a lookup table, or otherwise, may obtain information about firefighting fluid demand and flow of firefighting fluid and may operate one or more pumps more slowly, for less time, intermittently, or not at all (where not needed) in a manner that may improve or maximize energy efficiency, conserving the available charge of the battery array 14.

Note that because main pump 80, the large-diameter-hose pump 100, and the pre-connect pump 120 are powered by electric motors (preferably electric motors integrated therewith as a unit), the pumps are able, upon detection of demand or a need for increased flow of firefighting fluid, to accelerate and increase flow of firefighting fluid quickly from a low operating speed or even from a stop. A pump with a low mass moment of inertia (in relation to its pumping capacity) may accelerate quickly to the speed needed to provide the required pressure and flow. A close-coupled pump mounted to a high-torque electric motor (or having such a motor integral thereto) may allow the pump to accelerate to an appropriate speed and to provide the demanded flow of firefighting fluid. Further, a plurality of electric pumps of various capacities may be connected through electrical circuits to the battery array 14 and operated as needed, completely independently from one another, with the pumps consuming power from the battery array 14 only when in operation. The plurality of pumps may be arranged to provide liquid flow in parallel to each other, offering flexibility to use only the pumping power necessary to supply liquid to particular nozzles, at the particular flow rates and pressures, as needed for a particular use of the pump system 10. This mode of operation is quite different from the operation of a traditional fire truck chassis powered by an internal-combustion engine, in which the internal-combustion engine must be kept in an idle condition, with the internal combustion engine idling (running, at the cost of substantial energy usage) in order to maintain a connected pump system in a standby condition (with no demand for firefighting fluid). With a traditional fire truck chassis, a pump connected to the internal-combustion engine may also need to be kept in operation (with pressure relief) to maintain a selected standby condition, even if no liquid is demanded at any of the nozzles.

The methods disclosed herein may be adapted to and performed in conjunction with any apparatus disclosed herein. Any apparatus disclosed herein may have a controller 200 adapted to implement any method disclosed herein.

In the pump system 10, pumps on the discharge side—for example, pre-connect pump 120 and other pre-connect pumps, where included—may be designed for optimum efficiency for a particular intended application (flow rate, pressure, etc.) and need not be compromised for lift performance (working across a broader range of pressures), which could lower efficiency. In certain embodiments, the pump system 10 could include a small electric pump for each discharge valve or nozzle, for example, when a manifold 1100 is used, as shown in FIG. 3. A pump and a discharge valve could be provided as a single unit, also as shown in FIG. 3.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure as defined by the appended claims.

I claim:

1. A firefighting apparatus comprising:

a movable fire truck chassis;

a battery array movable with the movable fire truck chassis and operatively connected to provide power for operating at least one pump of the firefighting apparatus;

a drive motor carried by the movable fire truck chassis and operatively connected to drive movement of the movable fire truck chassis, the drive motor being operatively connected to receive power from the battery array;

a pre-connect pump having a pre-connect inlet and a pre-connect outlet and being electrically powered by the battery array; and a controller operatively connected to the pre-connect pump and configured to control the pre-connect pump under a standby condition selected to maintain the firefighting apparatus in a state of readiness to pump firefighting fluid, with the controller reducing a power-consumption rate of the pre-connect pump while maintaining the standby condition as compared to operating the pre-connect pump under an idle condition, and with the standby condition requiring pumping by at least one pump within the firefighting apparatus for maintenance of the standby condition.

2. The firefighting apparatus of claim 1, further comprising:

a pressure-maintenance pump having a pressure-maintenance inlet and a pressure-maintenance outlet in fluid communication with the pre-connect inlet, the pressure-maintenance pump being electrically powered by the battery array; and a pressure-maintenance check valve in fluid communication with the pressure-maintenance outlet and the pre-connect inlet and configured to prevent backward flow through the pressure-maintenance pump, wherein the controller is operatively connected to the pressure-maintenance pump and the pre-connect pump and configured to control the pressure-maintenance pump and the pre-connect pump under the standby condition while reducing a combined power-consumption rate of the pre-connect pump and the pressure-maintenance pump as compared to operating the pre-connect pump under the idle condition.

3. The firefighting apparatus of claim 1, further comprising:

a pressure-maintenance pump having a pressure-maintenance inlet and a pressure-maintenance outlet in fluid communication with the pre-connect inlet, the pressure-maintenance pump being electrically powered by the battery array; and a pressure-maintenance check valve in fluid communication with the pressure-maintenance outlet and the pre-connect inlet and configured to prevent backward flow through the pressure-maintenance pump, wherein the controller is operatively connected to the pressure-maintenance pump and configured to control the pressure-maintenance pump to maintain the standby condition while operating only the pressure-maintenance pump, and wherein the pressure-maintenance pump has a pressure-maintenance power consumption to maintain the standby condition, and the pressure-maintenance power consumption is less than a pre-connect minimum power consumption required to operate the pre-connect pump to maintain the standby condition.

4. The firefighting apparatus of claim 2, further comprising:

a main pump having a main inlet and a main outlet in fluid communication with the pre-connect inlet, the main pump being electrically powered by the battery array, wherein the controller is operatively connected to the pressure-maintenance pump, the pre-connect pump, and the main pump and configured to control the pressure-maintenance pump, the pre-connect pump, and the main pump under the standby condition while reducing a combined power-consumption rate of the pressure-maintenance pump, the pre-connect pump, and the main pump as compared to operating the pre-connect pump under the idle condition or the main pump under an idle condition.

5. The firefighting apparatus of claim 2, further comprising:

a hose pump having a hose-pump inlet and a hose-pump outlet in fluid communication with the pre-connect inlet, the hose pump being electrically powered by the battery array, wherein the controller is operatively connected to the pressure-maintenance pump, the pre-connect pump, and the hose pump and configured to control the pressure-maintenance pump, the pre-connect pump, and the hose pump under the standby condition while reducing a combined power-consumption rate of the pressure-maintenance pump, the pre-connect pump, and the hose pump as compared to operating the hose pump under an idle condition.

6. The firefighting apparatus of claim 5, further comprising:

a main pump having a main inlet and a main outlet in fluid communication with the pre-connect inlet, the main pump being electrically powered by the battery array, wherein the controller is operatively connected to the pressure-maintenance pump, the pre-connect pump, the hose pump, and the main pump and configured to control the pressure-maintenance pump, the pre-connect pump, the hose pump, and the main pump under the standby condition while reducing a combined power-consumption rate of the pressure-maintenance pump, the pre-connect pump, the hose pump, and the main pump as compared to operating the hose pump under the idle condition.

7. The firefighting apparatus of claim 6, further comprising: a selector-valve device having a selector inlet and a selector outlet, the selector outlet being in fluid communication with the main inlet, and the selector inlet configured to be connected in fluid communication with an unpressurized supply of firefighting fluid or a pressurized supply of firefighting fluid, wherein the controller receives firefighting-fluid-supply data indicating a connection of the unpressurized supply of firefighting fluid or the pressurized supply of firefighting fluid in fluid communication with the selector outlet, and wherein the controller is configured to control the pressure-maintenance pump, the pre-connect pump, the hose pump, and the main pump based in part on the firefighting-fluid-supply data.

8. The firefighting apparatus of claim 6, further comprising a main check valve in fluid communication with the main outlet and the pre-connect inlet and configured to prevent backward flow through the main pump.

9. The firefighting apparatus of claim 8, further comprising:

a first nozzle in fluid communication with the hose pump, the first nozzle having a first nozzle valve; and a second nozzle in fluid communication with the pre-connect pump, the second nozzle having a second nozzle valve, wherein a sensor providing demand data is operatively connected to sense an operating state of the first nozzle valve or the second nozzle valve, and wherein the controller is configured to control the pressure-maintenance pump, the pre-connect pump, the hose pump, and the main pump based in part on the demand data.

10. The firefighting apparatus of claim 9, further comprising:

a first discharge valve configured to control flow from the hose pump passing through the hose-pump outlet; or a second discharge valve configured to control flow from the pre-connect pump passing through the pre-connect outlet.

11. The firefighting apparatus of claim 10, further comprising:

a first collapsible hose connecting the first discharge valve in fluid communication with the first nozzle; or a second collapsible hose connecting the second discharge valve in fluid communication with the second nozzle.

12. The firefighting apparatus of claim 10, further comprising:

a first accumulator in fluid communication downstream from the first discharge valve and upstream from the first nozzle; or a second accumulator in fluid communication downstream from the second discharge valve and upstream from the second nozzle.

13. The firefighting apparatus of claim 1, wherein the controller is operatively connected to a sensor providing one or more demand data indicating a demand for pumping firefighting fluid, and wherein the controller, upon receiving the one or more demand data, activates the pre-connect pump to meet the demand for pumping firefighting fluid.

14. The firefighting apparatus of claim 6, wherein the controller is operatively connected to a sensor providing one or more demand data indicating a demand for pumping firefighting fluid, and wherein the controller, upon receiving the one or more demand data, activates the pre-connect pump, the hose pump, or the main pump to meet the demand for pumping firefighting fluid.

15. The firefighting apparatus of claim 14, wherein a total power consumption of the activated pump or pumps of the pre-connect pump, the hose pump, and the main pump is less than a total power consumption of the pre-connect pump, the hose pump, and the main pump when the pre-connect pump, the hose pump, and the main pump are activated concurrently.

16. The firefighting apparatus of claim 1, further comprising:

a foam-injection pump having a foam-injection outlet in fluid communication with the pre-connect inlet, the foam-injection pump being electrically powered by the battery array; and a foam-injection check valve in fluid communication with the foam-injection outlet and the pre-connect inlet and configured to prevent backward flow through the foam-injection pump, wherein the controller is operatively connected to the foam-injection pump and configured to control the foam-injection pump to inject foam only when firefighting fluid is flowing through the pre-connect pump.

17. A method for operating electrically powered pumps of a firefighting apparatus having a movable fire truck chassis and a battery array movable with the movable fire truck chassis, the battery array being operatively connected to provide power for at least one component of the firefighting apparatus, the firefighting apparatus having a drive motor carried by the movable fire truck chassis and operatively connected to drive movement of the movable fire truck chassis, the drive motor being operatively connected to receive power from the battery array, and a pre-connect pump having a pre-connect inlet and a pre-connect outlet and being electrically powered by the battery array, the method comprising:

operating a controller, the controller being operatively connected to the pre-connect pump having the pre-connect inlet and the pre-connect outlet, the controller controlling activation of the pre-connect pump under a standby condition selected to maintain the firefighting apparatus in a state of readiness to pump firefighting fluid, with the controller reducing a power-consumption rate of the pre-connect pump as compared to operating the pre-connect pump under an idle condition, while maintaining the standby condition, and with the standby condition requiring pumping by at least one of the electrically powered pumps for maintenance of the standby condition.

18. The method of claim 17, wherein the controller is operatively connected to a pressure-maintenance pump having a pressure-maintenance inlet and a pressure-maintenance outlet in fluid communication with the pre-connect inlet, the pressure-maintenance pump being electrically powered by the battery array, the pressure-maintenance pump being operatively connected to a pressure-maintenance check valve in fluid communication with the pressure-maintenance outlet and the pre-connect inlet and configured to prevent backward flow through the pressure-maintenance pump, and wherein the controller operates to control activation of the pressure-maintenance pump and the pre-connect pump under the standby condition while reducing a combined power-consumption rate of the pre-connect pump and the pressure-maintenance pump as compared to operating the pre-connect pump under the idle condition and the pressure-maintenance pump under an idle condition.

19. The method of claim 17, wherein the controller is operatively connected to a pressure-maintenance pump having a pressure-maintenance inlet and a pressure-maintenance outlet in fluid communication with the pre-connect inlet, the pressure-maintenance pump being electrically powered by the battery array, the pressure-maintenance pump being operatively connected to a pressure-maintenance check valve in fluid communication with the pressure-maintenance outlet and the pre-connect inlet and configured to prevent backward flow through the pressure-maintenance pump, and wherein the controller operates to control activation of the pressure-maintenance pump and the pre-connect pump under the standby condition, and wherein controller maintains the standby condition by operating only the pressure-maintenance pump, and wherein the pressure-maintenance pump has a reduced pressure-maintenance power consumption to maintain the standby condition, and the reduced pressure-maintenance power consumption is less than a pre-connect standby power consumption required to operate the pre-connect pump to maintain the standby condition.

20. The method of claim 19, wherein the controller is operatively connected to a hose pump having a hose-pump inlet and a hose-pump outlet in fluid communication with the pre-connect inlet, the hose pump being electrically powered by the battery array, and wherein the controller operates to control activation of the pressure-maintenance pump, the pre-connect pump, and the hose pump under the standby condition, and wherein the controller operates to control activation of the pressure-maintenance pump, the pre-connect pump, and the hose pump under the standby condition while reducing a combined power-consumption rate of the pressure-maintenance pump, the pre-connect pump, and the hose pump as compared to operating the pressure-maintenance pump, the pre-connect pump, and the hose pump under an idle condition.

21. The method of claim 20, wherein the controller is operatively connected to a main pump having a main inlet and a main outlet in fluid communication with the pre-connect inlet, the main pump being electrically powered by the battery array, and wherein the controller operates to control activation of the pressure-maintenance pump, the pre-connect pump, the hose pump, and the main pump under the standby condition, and wherein the controller operates to control activation of the pressure-maintenance pump, the pre-connect pump, the hose pump, and the main pump under the standby condition while reducing a combined power-consumption rate of the pressure-maintenance pump, the pre-connect pump, the hose pump, and the main pump as compared to operating the pressure-maintenance pump, the pre-connect pump, the hose pump, and the main pump under an idle condition.

22. The method of claim 21, wherein the controller is operatively connected to a sensor providing one or more demand data indicating a demand for pumping firefighting fluid, and wherein the controller, upon receiving the one or more demand data, activates the pre-connect pump, the hose pump, or the main pump to meet the demand for pumping firefighting fluid while reducing a combined power-consumption rate of the firefighting apparatus as compared to a power-consumption rate of the firefighting apparatus with the hose pump active, or with the main pump and the hose pump active.

* * * * *